United States Patent [19]

Branham

[11] Patent Number: 4,527,111
[45] Date of Patent: Jul. 2, 1985

[54] SAFETY JUMPER CABLES

[75] Inventor: Tillman W. Branham, Johnson City, Tenn.

[73] Assignee: Joseph N. Connell, Columbia, S.C.

[21] Appl. No.: 600,347

[22] Filed: Apr. 12, 1984

[51] Int. Cl.³ .......................................... H01M 10/46
[52] U.S. Cl. ................................................ 320/26
[58] Field of Search ......................... 320/25, 26, 2, 47

[56] References Cited

U.S. PATENT DOCUMENTS

| | | | |
|---|---|---|---|
| 3,259,754 | 7/1966 | Matheson | 307/85 |
| 3,281,816 | 10/1966 | Raymond | 340/249 |
| 3,308,365 | 3/1967 | St. John | 320/25 |
| 3,413,487 | 11/1968 | Gershen | 307/127 |
| 3,778,801 | 12/1973 | Nudelmont | 340/253 |
| 3,906,342 | 9/1975 | Pfouts | 340/253 |
| 4,063,171 | 12/1977 | Schweitzer, Jr. | 324/133 |
| 4,145,648 | 3/1979 | Zender | 320/25 |
| 4,166,241 | 8/1979 | Grant | 320/25 |
| 4,180,746 | 12/1979 | Giuffra | 307/127 |
| 4,217,534 | 8/1980 | Cole | 320/25 |
| 4,238,722 | 12/1980 | Ford | 320/25 |
| 4,400,658 | 8/1983 | Yates | 320/26 |

Primary Examiner—R. J. Hickey
Attorney, Agent, or Firm—Benoni O. Reynolds

[57] ABSTRACT

A battery jumper cable assembly for automatically assuring the safe connection of two storage batteries in a parallel relationship for charging the batteries or starting a motor vehicle which has a dead battery. Four normally open solenoid switches are included in the circuitry to align the two batteries automatically in proper polarity regardless of how the terminals of the two storage batteries are actually connected. An indicator light glows continuously when the hookup is completed and operating.

1 Claim, 2 Drawing Figures

SAFETY JUMPER CABLES

BACKGROUND OF THE INVENTION

1. Field of Invention

This invention relates to battery jumper cables designed to alert the user as to whether storage batteries are connected in proper parallel relationship for charging the weaker battery or for starting a motor vehicle containing the weaker battery. Also this invention relates to battery jumper cables designed to permit the flow of charging current between the two storage batteries only when the batteries are connected in proper parallel relationship for the charging or starting functions outlined above.

2. Description of Prior Art

The improper connection of two storage batteries for charging purposes or for starting an automobile has long posed problems of safety. Connecting storage batteries, other than in parallel, can cause damage to the batteries and associated alternators and can even cause fires if arcing ignites the gases given off by the batteries. Prior art has sought to alleviate the problem by various types of polarity indicators to indicate when battery jumper cables are properly connected. An alternative approach has been circuitry designed to prevent the flow of charging current unless the batteries are connected properly. Various types of diodes and bulbs have been used as indicator lights in the first approach. Various types of power transistors and electromagnetic switches have been used in the alternate approach. Silicon diodes were found to be sensitive to overloads and rectifiers were found to be vulnerable to high currents of reverse polarity. These polarity control systems were adapted both for use with battery charging rectifiers and with independent battery jumper cables.

In the protective circuitry prior art, manual steps were usually involved. Power transistors or other one way electrical devices were used to block current during an improper hookup. After a proper hookup, manual switches were used to energize electromagnetic switches to complete the continuity of charging current between the batteries. None of the systems of the prior art appear to be fully automatic as is the present invention. Also, none of the cables in the prior art provide a disconnect means for opening the circuit by push button for sparkless disconnection of the two batteries.

Prior art known to this inventor includes the following U.S. patent numbers:

| | | |
|---|---|---|
| 3,259,754 | 7/1966 | Matheson |
| 3,281,816 | 10/1966 | Raymond |
| 3,308,365 | 3/1967 | St. John |
| 3,413,487 | 11/1968 | B. J. Gershen |
| 3,778,801 | 12/1973 | Nudelmont |
| 3,906,342 | 9/1975 | Pfouts |
| 4,063,171 | 12/1977 | Schweitzer, Jr. |
| 4,145,648 | 3/1979 | Zender |
| 4,180,746 | 12/1979 | Giuffra |
| 4,238,722 | 12/1980 | Ford |

BRIEF SUMMARY OF THE INVENTION

The present invention is a pair of Safety Battery Jumper Cables which are automatic in that the components and circuitry are designed so that the two interconnected storage batteries will be in proper polarity relationship for charging or starting, regardless of the polarity in which the battery jumper cables are actually connected.

According to the preferred embodiment of this battery jumper cables assembly, the components are mounted in a single small box which is an integral part of both of the battery jumper cables. Each battery jumper cable is interconnected with two, normally open, single pole, single throw solenoid switches. One solenoid switch is connected in series with its own battery jumper cable and the second switch is connected in series with the other jumper cable. The four solenoid switches control the electrical continuity within a particular battery jumper cable or between the battery jumper cables. Only one of the solenoid switches in each of the battery jumper cables is activated (closed) at any one time, providing continuity of current either through its own battery jumper cable or through the other battery jumper cable. A gang of four release switches, normally closed, is provided to control current to the solenoid switches. Each release switch is connected in series with a different solenoid switch to control the current to the particular solenoid switch. An indicator light is connected in parallel with two of the solenoid switches, one solenoid switch from each battery jumper cable, to indicate visually when either of these particular solenoid switches has been activated (closed) and therefore, that charging is occuring. A gang of four activating switches, normally open, is provided to control temporary activating current to each solenoid switch. Each activating switch is connected in series with the coil of a different solenoid switch to momentarily supply current to the coil of the particular solenoid switch for initially activating the switch. Four dropping resistors are provided, each dropping resistor connected in series with the coil of a different solenoid switch to reduce the voltage applied to the particular solenoid switch.

The components described above for the battery jumper cable assembly are interconnected by circuitry to provide the following mode of operation when the ganged four activating switches are momentarily depressed, regardless of whether each battery jumper cable interconnects terminals of unlike polarity or like polarity as between two storage batteries.

Current passes from the positive terminal of each storage battery, through all four activating switches and all four release switches to the two solenoid switches having negative polarity, causing them to close. The circuitry is such that each of these two solenoid switches is in series with a different battery jumper cable. These two solenoid switches, upon closing, directly interconnect the terminals of like polarity of the two batteries, providing continuity of current in both battery jumper cables in the correct polarity for charging or starting. At the same time current passes from the positive terminals of each battery to the coil of each of the previously activated solenoid switches, passing through one of the dropping resistors and one of the release switches, to the negative terminal (ground) of the other battery, there-by holding each of the previously activated solenoid switches in a closed position after the ganged activating switches are no longer depressed. The indicator light will glow due to voltage present in one of the two dropping resistors to which the indicator light is connected in parallel, thus indicating visually that the battery jumper cable hookup is completed and operating. To disconnect the batteries without touching the cable connectors, the operator need only momentarily press the ganged release switch, which will cut the current to the activated solenoid switches causing them to open and stay open.

OBJECTIVES OF THE INVENTION

The objectives of the present invention are to provide a pair of battery jumper cables which will:

(1) Safely and easily interconnect two storage batteries without the danger of arcing, shorting or the ignition of the explosive gases associated with such batteries;

(2) Not endanger the alternator, generator or the ignition system of any automobile to which the cables may be attached;

(3) Visually indicate when the battery jumper cables are hooked up and operating for charging a storage battery or starting an automobile containing one of the storage batteries;

(4) Automatically route the current between the two storage batteries so that the batteries are always interconnected in a correct polarity relationship, regardless of the polarity of the actual hookup;

(5) Permit instant disconnection without touching the battery cable clamps, thus avoiding the danger of arcing or explosion of the gases associated with storage batteries;

Other objectives and advantages of the present invention will be apparent during the course of the following detailed description.

DETAILED DESCRIPTION OF THE PREFERRED EMBODIMENT OF THE INVENTION

Figure 1:
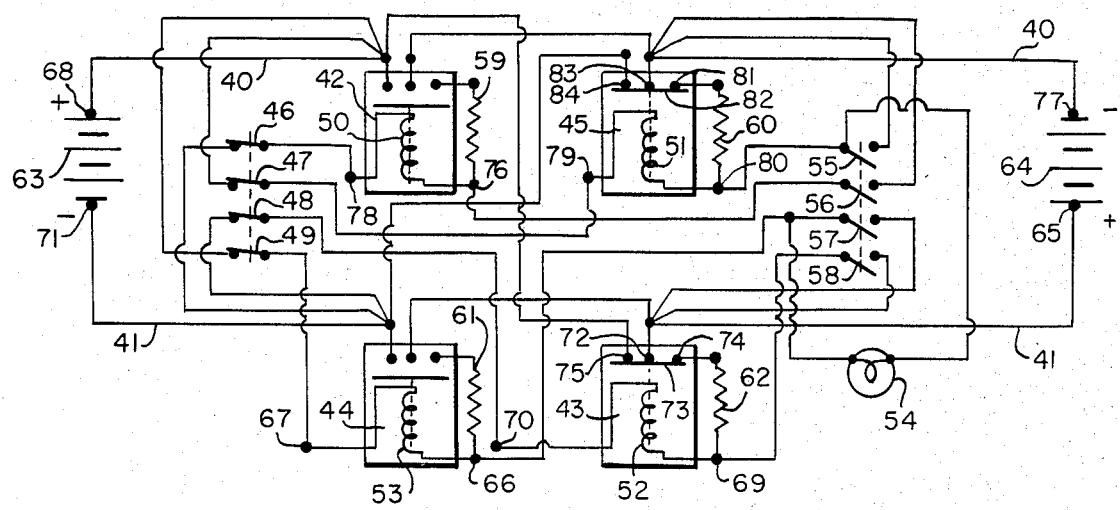
FIG. 1 is a schematic drawing of Safety Battery Jumper Cables constructed in accordance with the present invention, showing the circuitry between two storage batteries when the battery jumper cables are fastened to terminals of unlike polarity.

According to the preferred embodiment of the present invention, a pair of battery jumper cables are assembled as shown in FIG. 1, the components being mounted in a single small box which is an integral part of both battery jumper cable 40 and battery jumper cable 41. Battery jumper cable 40 and battery jumper cable 41 are each interconnected to two normally open, single pole, single throw solenoid switches. One of the two solenoid switches, shown in general at 42, is connected in series with battery jumper cable 40. The second solenoid switch, shown in general at 43, is connected in series with both battery jumper cable 40 and battery jumper cable 41. Similarly, solenoid switch, shown generally at 44, is connected in series with battery jumper cable 41. A second solenoid switch, shown generally at 45, is connected in series with both battery jumper cable 41 and battery jumper cable 40. Solenoid switch 42 controls the continuity of current within battery jumper cable 40. Solenoid switch 44 controls the continuity of current within battery jumper cable 41. Solenoid switch 43 controls the continuity of current between battery jumper cable 41 and battery jumper cable 40. Solenoid switch 45 controls the continuity of current between battery jumper cable 40 and battery jumper cable 41. Only one of the solenoid switches in each battery jumper cable is activated (closed) at any one time, providing electrical continuity either through its own battery jumper cable or through the other battery jumper cable.

A gang of four release switches 46, 47, 48 and 49, normally closed, control current to the coils of the solenoid switches. Release switch 46 is connected in series with, and controls current to, coil 50 of solenoid switch 42. Release switch 47 is connected in series with, and controls current to, coil 51 of solenoid switch 45. Release switch 48 is connected in series with, and controls current to, coil 52 of solenoid switch 43. Release switch 49 is connected in series with, and controls current to, coil 53 of solenoid switch 44. "Go" indicator light 54 is connected in parallel with solenoid switch 43 and solenoid switch 42, to indicate when either solenoid switch 43 or solenoid switch 42 is activated, thus indicating charging is occurring.

A gang of four activating switches 55, 56, 57 and 58, normally open, temporarily control activating current to solenoid switches 45, 42, 44 and 43. Activating switch 55 is connected in series with, and temporarily controls actuating current to, coil 51 of solenoid switch 45. Activating switch 56 is connected in series with, and temporarily controls activating current to coil 50 of solenoid switch 42. Activating switch 57 is connected in series with and temporarily controls activating current to coil 53 of solenoid switch 44. Activating switch 58 is connected in series with and temporarily controls activating current to coil 52 of solenoid switch 43. Dropping resistors 59, 60, 61 and 62 are each connected in series with the coil of a different solenoid switch to reduce the voltage supplied to the particular solenoid switch after activating switches 55, 56, 57 and 58 are released. Dropping resistor 59 reduces the permanent voltage applied to coil 50 of solenoid switch 42. Dropping resistor 60 reduces the permanent voltage applied to coil 51 of solenoid switch 45. Dropping resistor 61 reduces the voltage applied to coil 53 of solenoid switch 44. Dropping resistor 62 reduces the voltage applied to coil 52 of solenoid switch 43.

When ganged activating switches 55, 56, 57 and 58 are momentarily depressed, the circuitry is such that regardless of whether battery jumper cables 40 and 41 interconnect terminals of like or unlike polarity as between storage battery 63 and storage battery 64, only circuits matching the like terminals of said storage batteries are activated.

FIG. 1 shows the circuitry when battery jumper cables 40 and 41 are fastened to terminals of unlike polarity on storage batteries 63 and 64. When ganged activating switches 55, 56, 57 and 58 are momentarily depressed, cable clamp 65, fastened to the positive terminal of storage battery 64, interconnects through activating switch 57 to lower coil terminal 66 of coil 53 of solenoid switch 44. As upper coil terminal 67 is connected through release switch 49 to cable clamp 68 and the positive terminal of storage battery 63, solenoid switch 44 is not activated because of voltages of like polarity on both terminals of coil 53. At the same time current is passing from the same cable clamp 65, fastened to the positive terminal of the same storage battery 64, through activating switch 58 to lower coil terminal 69 of coil 52 of solenoid switch 43. As upper coil terminal 70 of this same coil 52 is connected through release switch 48 to cable clamp 71 and the negative terminal of storage battery 63, solenoid switch 43 is activated and closed. Current continues to flow from cable clamp 65 through terminal 72, shorting bar 73, terminal 74 and dropping resistor 62 to lower coil terminal 69, causing solenoid switch 43 to remain latched even when ganged activating switches 55, 56, 57 and 58 are no longer momentarily depressed. While solenoid switch 43 is closed, shorting bar 73 also provides continuity of current between terminal 72, which is connected directly to the positive terminal of storage battery 64, and terminal 75, which is connected directly to the positive terminal of storage battery 63.

Figure 2:
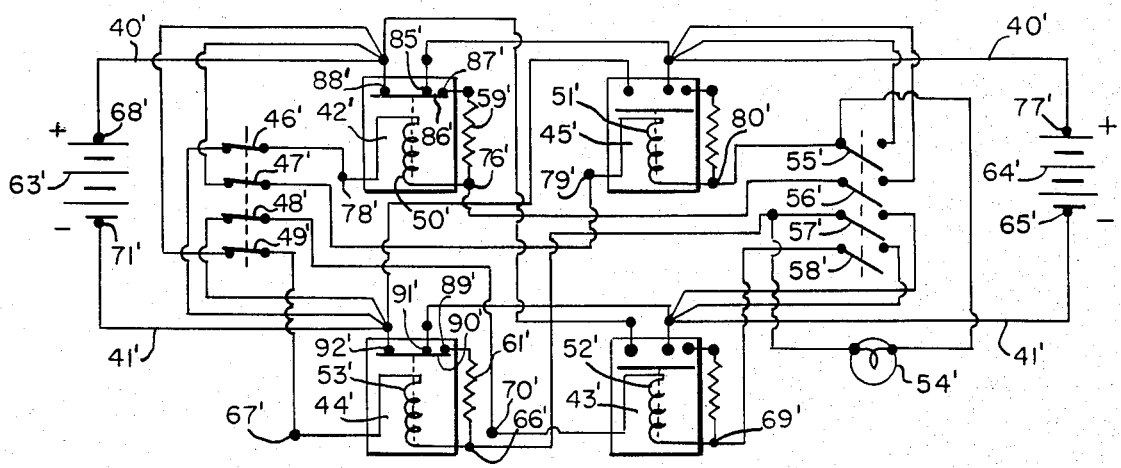
FIG. 2 is a schematic drawing of the present invention, showing the circuitry between two storage batteries when the battery jumper cables are fastened to terminals of like polarity.

A similar operation takes place simultaneously between the other pair of solenoid switches. When ganged acivating switches 55, 56, 57 and 58 are momentarily depressed, lower coil terminal 76 of coil 50 of solenoid switch 42 interconnects with cable clamp 77 and the negative terminal of storage battery 64 through activating switch 56. As upper coil terminal 78 of this same coil 50 is interconnected with cable clamp 71 and the negative terminal of storage battery 63, through release switch 46, solenoid switch 42 is not activated because of voltages of like polarity on both terminals of coil 50. At the same time, current is passing from cable clamp 68, fastened to the positive terminal of storage battery 63, through release switch 47, to upper coil terminal 79 of coil 51 of solenoid switch 45. As lower coil terminal 80 of this same coil 51 is connected through activating switch 55, to cable clamp 77 and the negative terminal of storage battery 64, solenoid switch 45 is activated and closes. Current continues to flow from cable clamp 68 through release switch 47, coil 51, dropping resistor 60, terminal 81, shorting bar 82, and terminal 83 to the negative terminal of storage battery 64, causing solenoid switch 45 to remain closed even when ganged activating switches 55, 56, 57 and 58 are no longer momentarily depressed. While solenoid switch 45 is closed, shorting bar 82 also provides continuity of current between terminal 83 which is connected directly to the negative terminal of storage battery 64 and terminal 84 which is connected directly to the negative terminal of storage battery 63. Indicator light 54 will glow continuously because of the presence of a voltage across dropping resistor 62 to which indicator light 54 is connected in parallel. The glow of indicator light 54, preferably green in color, indicates visually that the battery jumper cable hookup is completed and operating. To disconnect battery jumper cables 40 and 41 electrically from storage batteries 63 and 64, the operator need only momentarily press ganged release switches 46, 47, 48 and 49, which are normally closed. This action will cut the current to solenoid switches 43 and 45, causing them to resume their normally open positions and to stay open. As there is no longer continuity of current in the battery jumper cables 40 and 41, the operator can safely unfasten cable clamps 65, 68, 71 and 77, from storage batteries 3 and 64, without arcing or danger of explosion. FIG. 2 shows the circuitry when battery jumper cables 40' and 41' are fastened to terminals of like polarity on storage batteries 63' and 64'. When ganged activating switches 55', 56', 57' and 58' are momentarily depressed, cable clamp 77', fastened to the positive terminal of storage battery 64', interconnects, through activating switch 55', to lower coil terminal 80' of coil 51' of solenoid switch 45'. As upper coil terminal 79' is connected through release switch 47' to cable clamp 68' and the positive terminal of storage battery 63', solenoid switch 45' is not activated because of voltages of like polarity on both terminals of coil 51'. At the same time, current is passing from the same cable clamp 77', fastened to the positive terminal of the same storage battery 64', through activating switch 56', to lower coil terminal 76' of coil 50' of solenoid switch 42'. As upper coil terminal 78' of this same coil 50' is connected through release switch 46' to cable clamp 71' and the negative terminal of storage battery 63', solenoid switch 42' is activated and closes. Current continues to flow from cable clamp 77' through terminal 85', shorting bar 86', terminal 87' and dropping resistor 59' to lower coil terminal 76', causing solenoid switch 42' to remain closed even when ganged activating switches 55', 56', 57' and 58' are no longer momentarily depressed. While solenoid switch 42' is closed, shorting bar 86' also provides continuity of current between terminal 85' which is connected directly to the positive terminal of storage battery 64' and terminal 88' which is connected directly to the positive terminal of storage battery 63'.

A similar operation takes place simultaneously between the other pair of solenoid switches. When ganged activating switches 55', 56', 57', and 58' are momentarily depressed, current passes from cable clamp 68', fastened to the positive terminal of storage battery 63' through release switch 49', to upper coil terminal 67' of coil 53' of solenoid switch 44'. As lower coil terminal 66' of this same coil 53' is connected through activating switch 57' to cable clamp 65' and the negative terminal of storage battery 64', solenoid switch 44' is activated and closes. Current continues to flow from cable clamp 68' through lower coil terminal 66' dropping resistor 61', terminal 89' shorting bar 90', and terminal 91', to cable clamp 65' and the negative terminal of storage battery 64', causing solenoid switch 44' to remain closed even when ganged activating switches 55', 56', 57' and 58' are no longer momentarily depressed. While solenoid switch 44' is closed, shorting bar 90' also provides continuity of current between terminal 91' which is connected directly to the negative terminal of storage battery 64' and terminal 92' which is connected directly to the negative terminal of storage battery 63'. At the same time when ganged activating switches 55', 56', 57' and 58 are momentarily depressed, lower coil terminal 69' of coil 52' of solenoid switch 43' interconnects with cable clamp 65' and the negative terminal of storage battery 64' through activating switch 58'. As upper coil terminal 70' of this same coil 52' is interconnected with cable clamp 71' and the negative terminal of storage battery 63' through release switch 48', solenoid switch 43' is not activated because of voltages of like polarity on both terminals of coil 52'. Indicator light 54' will glow continuously due to the presence of a voltage across dropping resistor 59' to which indicator light 54' is connected in parallel. The glow of indicator light 54' preferably green in color, indicates visually that the battery jumper cable hookup is completed and operating. To disconnect battery jumper cable 40' and 41' electrically from storage batteries 63' and 64', the operator need only momentarily press ganged release switches 46', 47', 48' and 49', which are normally closed. This action will cut the current to solenoid switches 42' and 44' causing them to resume their normally open positions and to stay open. As there is no longer continuity of current in battery jumper cables 40' and 41', the operator can safely unfasten cable clamps 65', 68', 71' and 77' from storage batteries 63' and 64' without arcing or danger of explosion.

I claim:

1. A battery jumper cable assembly having a pair of battery jumper cables for automatically connecting two storage batteries in a parallel relationship after cable clamps attached to the ends of each of the pair of first and second battery jumper cables have been connected, one cable clamp from each of said battery jumper cables to each of said storage batteries, comprising, in combination:

four normally open single pole, single throw solenoid switches,
one of said solenoid switches connected in series with said first battery jumper cable, one of said solenoid switches connected in series with said second battery jumper cable, and the remaining two of said solenoid switches connected in series with both said first and said second battery jumper cables; and a gang of four normally closed release switches, two of said release switches each being connected in series between said first battery jumper cable, upstream of said solenoid switches, and a separate one of the coils of said solenoid switches, and the other two of said release switches each being connected in series between said second battery jumper cable, upstream of said solenoid switches, and a separate one of the coils of said solenoid switches; and a gang of four normally open actuating switches, two of said actuating switches each being connected in series between said first battery jumper cable, downstream of said solenoid switches, and a separate one of said coils of said solenoid switches, and the other two of said actuating switches each being connected in series between said second battery jumper cable, downstream of said solenoid switches, and a separate one of said coils of said solenoid switches; and four dropping resistors, each of said dropping resistors separately connected at one end to a normally open contact of one of said solenoid switches, and the other end of said dropping resistor connected to the coil of the associated solenoid switch, upstream from said normally open actuating switch;

whereby when said ganged activating switches are pressed momentarily closed, two of the normally open solenoid switches will close, interconnecting directly the two storage batteries in a parallel relationship, providing continuity of current in both battery jumper cables, and current will pass through the dropping resistors associated with the two activated closed solenoid switches to thereby latch said closed solenoid switches, holding each of said activated solenoid switches in a closed position, after said ganged activating switches are no longer depressed.

* * * * *